United States Patent
Gydesen

(10) Patent No.: US 7,641,448 B2
(45) Date of Patent: Jan. 5, 2010

(54) CLEANING AN INK CHAMBER OF A PRINTING UNIT

(75) Inventor: Erik Gydesen, Vejle (DK)

(73) Assignee: Tresu Anlæg A/S, Bjert (DK)

( * ) Notice: Subject to any disclaimer, the term of this patent is extended or adjusted under 35 U.S.C. 154(b) by 0 days.

(21) Appl. No.: 10/593,454

(22) PCT Filed: Mar. 12, 2005

(86) PCT No.: PCT/DK2005/000170

§ 371 (c)(1),
(2), (4) Date: Oct. 23, 2006

(87) PCT Pub. No.: WO2005/090080

PCT Pub. Date: Sep. 29, 2005

(65) Prior Publication Data

US 2007/0146412 A1    Jun. 28, 2007

(30) Foreign Application Priority Data

Mar. 19, 2004    (DK) ............................... 2004 00448

(51) Int. Cl.
*F04B 41/06* (2006.01)
(52) U.S. Cl. ....................... 417/4; 137/209; 36/59 A
(58) Field of Classification Search ................... None
See application file for complete search history.

(56) References Cited

U.S. PATENT DOCUMENTS

| | | | |
|---|---|---|---|
| 2,933,102 A | 4/1960 | Hillman et al. | |
| 3,662,781 A * | 5/1972 | Figliola et al. | 137/543.17 |
| 5,816,163 A | 10/1998 | Achelpohl et al. | |
| 6,024,016 A * | 2/2000 | Shimohatsubo et al. | 101/350.6 |
| 6,602,566 B2 * | 8/2003 | Steenbergen | 428/35.7 |
| 6,623,564 B2 * | 9/2003 | Yamaguchi et al. | 134/16 |
| 6,755,130 B2 * | 6/2004 | Kersch et al. | 101/484 |
| 6,964,792 B1 * | 11/2005 | Mayer et al. | 427/430.1 |
| 2002/0023561 A1 | 2/2002 | Leimand | |
| 2003/0167949 A1 | 9/2003 | Kersch et al. | |

FOREIGN PATENT DOCUMENTS

| | | |
|---|---|---|
| DE | 1987459 | 6/1968 |
| DE | 29715358 | 12/1997 |
| DK | 173668 | 6/2001 |
| EP | 0570727 | 11/1993 |
| EP | 0612618 | 8/1994 |
| WO | WO 03/091027 | 11/2003 |

* cited by examiner

*Primary Examiner*—Stephen D Meier
*Assistant Examiner*—Alexander C Witkowski
(74) *Attorney, Agent, or Firm*—James Creighton Wray; Meera P. Narasimhan

(57) ABSTRACT

There is described a method and a system for cleaning an ink chamber (1) of a printing unit. The system includes a storage tank (10) which via a high-pressure pump (9) is connected with a hydrophore (2). In the hydrophore a high pressure is built up, and the hydrophore is connected with cleaning nozzles (40) via a valve (5). Thus it becomes possible to inject a shot of cleaning liquid into the chamber by switching the valves (5). The cleaning nozzles are preferably designed as a mushroom-shaped plug (40) with a stem (41) which is mounted in the chamber wall and which has a circular domed top (43) of elastic, resilient material. When injecting cleaning liquid, the elastic plug will spray cleaning liquid out into the chamber, and after shutting off the pressure, there will be a self-closing effect.

16 Claims, 4 Drawing Sheets

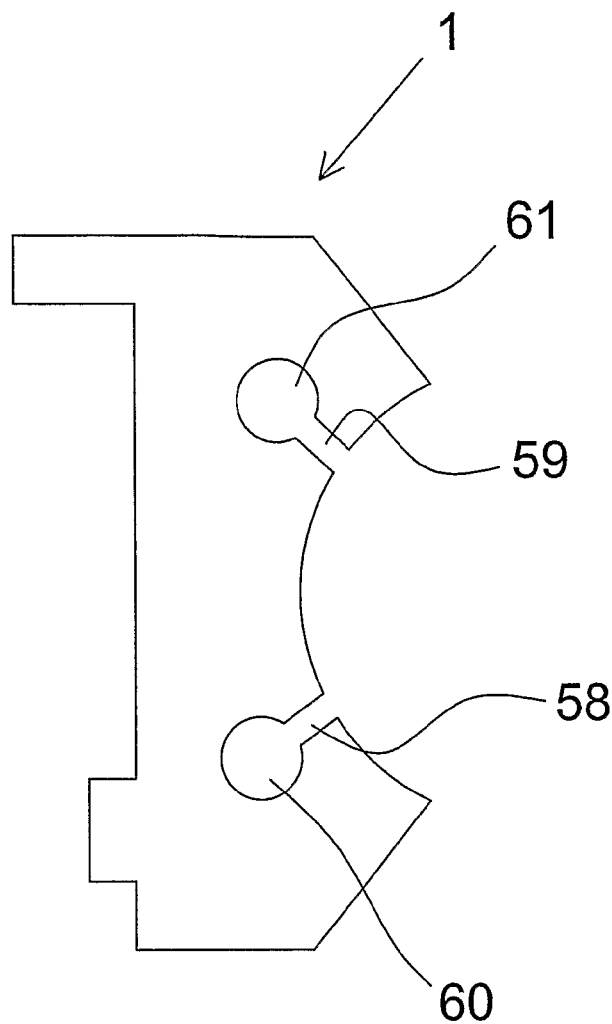
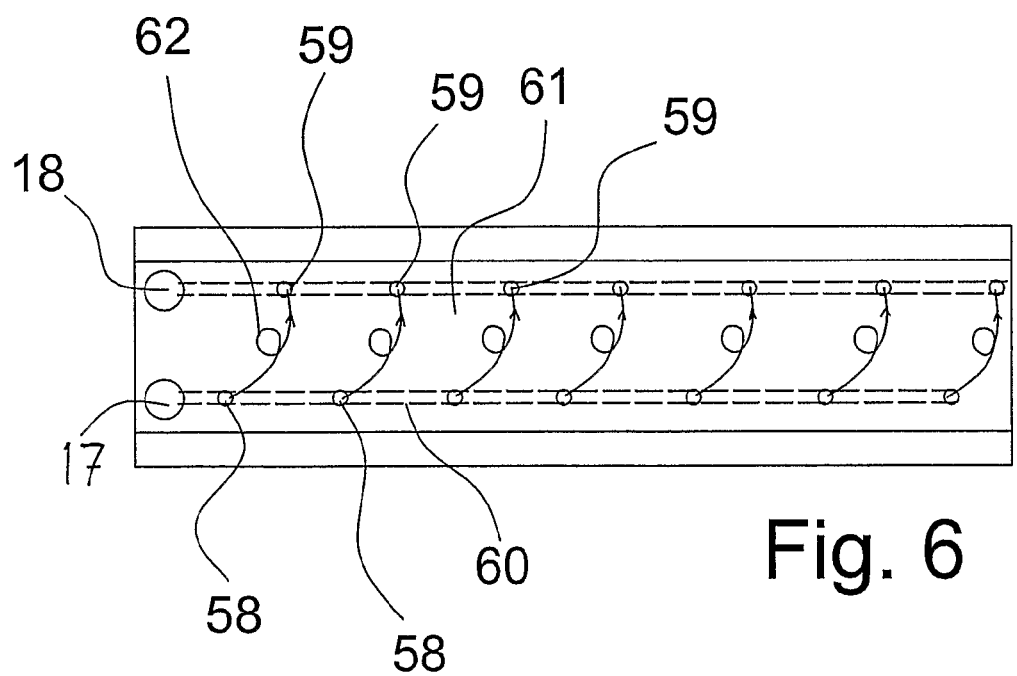

CLEANING AN INK CHAMBER OF A PRINTING UNIT

This application claims the benefit of Danish Application No. PA 2004 00448 filed Mar. 19, 2004 and PCT/DK2005/000170 filed Mar. 12, 2005, which are hereby incorporated by reference in their entirety.

BACKGROUND OF THE INVENTION

The present invention concerns a method for cleaning the ink chamber of a printing unit, preferably a chamber in a doctor blade, where pressurised cleaning liquid is sprayed into the chamber through at least one cleaning nozzle.

The invention also concerns a system for cleaning an ink chamber of a printing unit, preferably a chamber in a doctor blade, including at least one cleaning nozzle through which pressurised cleaning liquid is sprayed into the chamber.

The invention furthermore concerns a cleaning nozzle for use in a chamber in a doctor blade, where pressurised cleaning liquid is injected into the chamber through at least one such nozzle.

The prior art comprises a method for supplying a printing unit with cleaning liquid for cleaning the ink chamber of the printing unit and other components after each colour printing. The printing unit includes an ink chamber, preferably in the form of a chamber in a doctor blade and a pumping unit with pumps for supply and return pumping of ink/cleaning liquid. The cleaning liquid is pumped into the ink chamber through inlet/outlet of the chamber. The printing unit also includes suction lances for disposition in tank for ink/cleaning liquid for sucking up or return pumping cleaning liquid/ink and connecting lines with shut-off and switching valves which are controlled by a control unit for establishing the following steps:

- an operation step where ink is circulated through the chamber;
- an emptying step where the chamber is emptied for ink which is pumped back to the ink tank;
- a step where a small amount of cleaning liquid is injected via the nozzles in the chamber and together with the last amount of ink pumped back to the ink tank;
- a cleaning step where the chamber at least once is circulated with cleaning liquid pumped into the chamber via inlets/outlets and which is circulated through the components of the printing unit;
- a further cleaning step where the chamber is flushed with cleaning liquid which is injected via separate cleaning nozzles and which is circulated through the components of the printing unit;
- a final step where the components of the printing unit is pumped free/emptied from cleaning liquid, after which an operation step may be initiated again.

As the ink chamber is provided with cleaning nozzles, it is possible to establish a secure flushing of the chamber between different operation steps with a minimal consumption of cleaning liquid. This may reduce the time used for cleaning and reduce the consumption of cleaning liquid. If these cleaning nozzles are also used during the last part of an emptying step, the ink chamber will be partly cleaned already after the emptying step. The amount of cleaning liquid and the time used for the subsequent flushing step may hereby be reduced. Finally, the amount of cleaning liquid may be further reduced when the final step is a reversal of the pumps for emptying the components of the printing unit for cleaning liquid, so that it is stored in the cleaning tank and is ready for use at the succeeding flushing step.

The used pumping unit forms part of a printing unit with an ink chamber and includes pumps for supply and return pumping of ink/cleaning liquid from an ink tank and a cleaning tank, respectively, suction lances for placing in the tanks and connecting lines with shut-off and switch valves that are controlled by a control unit.

The prior art pumping unit may be a separate unit with its own control system. Hereby, it may very easily be adapted to new or existing printing units as it may only be connected with these via return and supply lines to the ink chamber. Alternatively, it will also be possible to make a pump unit as an integrated part of the printing unit so that control is performed by means of a control unit simultaneously controlling the printing process itself.

US 2003/0167949 also discloses a cleaning system for printing machines. In this application there is described a system where water or liquid is stored in a container which is pressurised by a common air supply system for the associated printing machine. This means that a low pressure system is used for pressurising the storage container. In order that the container can be used in common cleaning, it will have a relatively large volume. When a large volume is used together with low pressure, there will be a need for a relatively large and energy consuming pump in order to attain a capacity that enables cleaning with a series of short shots during a cleaning cycle.

Printing units are used extensively within the graphic industry for multi-colour printing. Often there is a need for rapid and simple shifting between different ink colours. This puts demands on rapid and efficient cleaning as well as there is also a requirement that a large part of the ink amount as possible is returned to an ink tank for use in a later printing. It is desirable to return the ink to the ink tank, partly for avoiding contamination of cleaning water and partly for saving material expenses.

Printing units may be used for flexographic printing, coating, offset printing or other kinds of printing, where ink is transferred to a printing roller via a unit comprising ink chamber/screen roller, or directly to a print carrier.

In order to utilise the printing unit as efficiently as possible, it is desirable to have a time of change between the various ink colours so that the changing may be performed as quickly and automatically as possible.

However, the system will not provide for a secure and efficient cleaning of the ink chamber but only flushing, as the pressure at which the cleaning liquid is injected into the pipe depends on the pump capacity in the moment of injection. A large pump capacity is required, typically about 20-40 l/s, for achieving efficient flushing. A large pumping capacity is need if a large pressure is to be maintained at the injection. In order to avoid pressure loss and thereby reduced injection pressure, it will therefore be necessary with relatively large dimensions in connecting lines and pipes. Insufficient cleaning entails risk of ink residue giving problems at a subsequent operation step with a new colour. In order to get sufficient capacity, a large space-consuming and energy-consuming cleaning unit connected with the chamber via thick lines is provided in the prior art systems. The pump capacity produces a system with inferior energy economy as the pump has to operate continuously at high pressure with large capacity to be ready for giving off short shots during a cleaning cycle.

The description of U.S. Pat. No. 2,933,102 discloses a valve where pressurised liquid is used for deforming a flexible hat or top so that a fluid passage is opened through the stem of the valve. This valve, however, is primarily suited for air where there is no risk of clogging the narrow duct in the interior of the stem. Furthermore, there is no possibility of directing the discharged fluid in a desired direction when the valve is opened.

SUMMARY OF THE INVENTION

The purpose of the present invention is to indicate a system including a method, a system and a cleaning nozzle that enable constructing a technically simple and reliable system working according to a method which enables use of a small energy-saving and space saving high-pressure pump, and which facilitate replacing the cleaning nozzles.

According to the invention, this is achieved with a method which is peculiar in partial filling a hydrophore by means of a high-pressure pump with liquid from a storage tank, a supply system or a water tap, building up a predetermined pressure in the hydrophore, activation of at least one valve which is disposed between the hydrophore and the cleaning nozzle for injecting at least one shot of cleaning liquid in the ink chamber for executing a cleaning cycle controlled by the activation cycle of the valves.

The system according to the invention is peculiar in that it includes a hydrophore connected with a storage tank, supply system or a water tap via a high-pressure pump for transferring a volume of cleaning liquid for partly filling the hydrophore for building up a predetermined pressure in the hydrophore, at least one activatable valve disposed in a connection between the hydrophore and the cleaning nozzle, and which is adapted for opening the connection for injecting a shot of cleaning liquid into the ink chamber, and which is connected with a control for executing a cleaning cycle controlled by the activation cycle of the valves.

The cleaning nozzle according to the invention is peculiar in that it includes a largely mushroom-shaped nozzle body with a stem intended for mounting in the wall of the chamber, and which has a domed top of an elastic material, and furthermore that the nozzle also includes a second nozzle body in the form of a bushing for disposition in an opening in the chamber wall and with a central boring for accommodating the stem of the nozzle body and with through-going openings disposed thereabout, the openings covered by the domed top.

The nozzle body will be denoted a plug in the following, and it will preferably be made with a domed top which is largely circular. Alternatively, the top may have other shapes that provide the possibility of an elastic resilient abutment against the edge area around one or more injection openings in the cleaning nozzle.

Cleaning liquid may be any kind of liquid suited for cleaning the ink chamber. The cleaning liquid will often be water, but may also be water with additives.

According to a particular embodiment of the invention, the method is peculiar by filling a storage tank with cleaning liquid and transferring a volume of cleaning liquid from the storage tank for filling the hydrophore, where each cleaning cycle includes a number of shots with an interval of 5-15 seconds, preferably about 10 seconds.

By using the hydrophore, a small high-pressure pump with a capacity reduced with a factor 100 may be used. The pump only needs to have a pumping capacity of 10-12 l/min. This will provide capacity for shots with an endurance of ¹/₁₀ or a few tenths of a second and with an amount of about 2-4 liters per shot. The shots are repeated at intervals between 8 and 12 s. The hydrophore may have a content of 6-8 l cleaning liquid, and when about 2 l per shot are used, a sufficiently high pressure is maintained during the entire shot. After each shot, the high pressure pump will build up pressure in the hydrophore.

As cleaning liquid comes from a storage tank or from a supply system, it is only necessary to dimension the hydrophore itself and the short connecting lines to the chamber for high pressure. By disposing shut-off means in the shape of valves or similar between the chamber and the hydrophore, the cleaning cycle may be controlled by actuating the valve.

As mentioned above, the hydrophore may be made for containing a very limited amount of liquid, namely a small multiple of the amount to be used for each cleaning shot. This means that the hydrophore may be constructed with a very small volume with very short pipe connections to the cleaning nozzles. Hereby pressure losses in the pipes are avoided, and it becomes possible to work with a high injection pressure in the chamber so that good distribution of the cleaning liquid and hence efficient cleaning of the chamber is achieved. By using the above indicated magnitudes, a pressure variation may be from 16 bars at the start of a shot to 12 bars at the end of a shot. This will provide sufficiently high average pressure in the shot.

In order to ensure formation of a desired pressure level in the hydrophore during a cleaning cycle, it will be possible to connect a source of pressurised air, preferably a standard pressurised air system, to the hydrophore, so that prior to filling the hydrophore with cleaning liquid, air is pumped into the hydrophore. By emptying a part of the cleaning liquid during a shot, it will be possible to maintain a desired average pressure in the hydrophore during the cleaning cycle. Thereby is maintained a desired pressure with which cleaning liquid is injected into the ink chamber at the termination of a shot.

The hydrophore will contain part liquid and part air in the usual way. Hereby it becomes possible to compress the air so that the pressure is maintained at the desired predetermined level during the injection. In that way it will be possible to dimension the hydrophore and fill it with liquid in such a way that the desired pressure level is maintained even at the termination of a shot of cleaning liquid into the ink chamber.

Cleaning nozzles will usually be provided with spacing along the length of an ink chamber, e.g. with a mutual spacing of 10-20 cm. It is possible to design the hydrophore as an elongated chamber which is disposed in parallel with and in immediate association to the ink chamber itself. Hereby, there will be more connecting lines between hydrophore and the nozzle system in order to minimise pipe lengths and thereby the risk of pressure loss.

Irrespectively how many pipe connections there are between hydrophore and the number of cleaning nozzles used in a given ink chamber, the activation performed by the valve will control the executed cleaning cycle. It is thus possible to perform a number of single shots with a short duration, or, alternatively, a lesser number of shots with slightly longer duration in order to provide the cleaning needed in a given ink chamber. As the valves controlling the activation cycle is provided in the short pipe connection between hydrophore and cleaning nozzles, a very secure and efficient control is achieved, without risk of retardation in long connecting lines.

At the termination of a cleaning cycle, or as the last step in a cleaning cycle, the hydrophore and the ink chamber may be blown through with air for driving out cleaning liquid. The pressurised air system used for establishing the static pressure in the hydrophore, may advantageously be used for such a blowing. By performing the blowing, the risk of ink residues appearing in the printing unit is avoided, which can be detrimental to the quality of printing with a subsequent ink colour differing from the one cleaned out from the printing unit. If the pressurised air system is a standard pressurised air system, normally there will be provided a pressure of about 6 bar.

With a system according to the invention where the cleaning nozzles includes a mushroom-shaped plug or body, the elastic top will be in contact with the chamber wall or the bushing. Due to the resilient action in the material, the domed top may cover injection openings disposed through the sidewall/bushing of the chamber around the mounting opening for the stem of the plug. By using the bushing it is possible to dispose the through-going injection openings in a desired pattern in the opening in the chamber wall.

When the valves are to be actuated, a shot is released, whereby cleaning liquid is injected and acts on the underside of the domed top, whereby it is bent away from its abutment on the wall/bushing. Hereby is achieved a particularly efficient flushing and cleaning action, even when using limited amounts of cleaning liquid. A concentrated shot is thus achieved with the plug, as the top will flex back as soon as the valve is actuated for terminating the shot.

The cleaning liquid located in the pipe will thus be retained in the opening at the termination of the shot, and there will be no risk of liquid leaking into the chamber between succeeding shots.

The elastic action in the material may be dimensioned so that the cleaning nozzle only opens at a well-defined pressure. With the resilient abutment against the chamber wall or the bushing positioned in the chamber wall, at the same time there will be achieved a self-blocking nozzle so that there is no risk that the nozzle is entirely or partly closed by ink substance from the ink chamber. Thus is achieved dependable operation by the self-blocking valve.

It is possible to dispose the injection openings for cleaning liquid symmetrically around the stem of the plug, or to provide them asymmetrically, so that a spray of cleaning liquid is achieved, directed in the wanted direction inside the ink chamber.

In order to achieve a particularly flexible and simple cleaning nozzle, it will be made of plastic, preferably PVDF. Hereby is achieved a nozzle with a secure function which can resist the aggressive agents occurring in the applied inks and cleaning agents.

According to a further embodiment, the nozzle is peculiar in that the stem is provided with screw thread and adapted to be fastened by screwing into an opening in the chamber wall, and that the domed top has a notch for engaging a tool. With such a design, a nozzle may be changed in a very simple way in case of wear. This may be effected in a very simple way without need of disassembling the ink chamber. When speaking of a doctor blade, a user can get access to the domed top of the nozzles from the open front side of the doctor blade which is intended to be disposed against a screen roller. The nozzles may then easily be screwed out and then screwed in. This may be effected by using screwdriver, Allen key or other suitable tool. Since the nozzle is made with a domed top, there will space in the domed part for accommodating a notch, as the top still has enough material secure fastening to be enabled, even if the plug is made of a soft plastic material.

By using the domed plug there may also be established a hat or top covering the injection openings, and where a radial inner and outer surface is disposed at each side of such injection openings. At the underside of the top, inner and outer surfaces may be directed perpendicularly on the stem and be intended for abutment on the wall of the chamber. By continuing the radially outer and radially inner surface relatively to each other in unloaded condition, it is possible to bend the radially outwards directed surface rearwards when a radially inner surface is brought into abutment with the chamber wall during the mounting of the cleaning nozzle. It is thus possible to dimension the distance between the positions of the outer and the inner surfaces relative to each other so that a desired spring force is provided in the top. In a simple way is here established a desired opening pressure for the cleaning nozzle. Furthermore, there will also be formed an abutment pressure which securely provides for closing the injection openings during normal operation of the printing unit.

It is possible to dimension the underside of the domed top and provide it with different profiles within the radially outer surface. Hereby it becomes possible to direct injection in different directions within the ink chamber. Only it is to be ensured that the domed top has a radially outer rim area which is in contact with the chamber wall/bushing for blocking the injection openings when the printing unit is in normal operation, or between succeeding shots in a cleaning cycle.

According to preferred embodiments, the pressures existing in the hydrophore will be between 3 and 30 bars, preferably between 12 and 20 bars, and particularly about 16 bars. It is also possible to use pressures exceeding 30 bars, e.g. up to 150-200 bars, if the system is dimensioned to such high pressure. This pressure may e.g. be established with a standard high-pressure washer. For the formation of this pressure, a high-pressure liquid pump is used. The cleaning nozzles will preferably be adapted to open at a pressure between 2 and 12 bars, and preferably at a pressure between 4 and 8 bar.

Even though a particularly advantageous embodiment for a cleaning nozzle has been formed, it will be possible to use other so-called pop-up nozzles, which are resiliently biased towards a closed position for allowing injection of the cleaning nozzle at the activation of the valves. However, traditional spring-biased nozzles may be exposed to corrosive action from the applied inks.

In an embodiment of the system, it is preferred that the storage tank is a small tank provided with a heating unit, so that the cleaning liquid may be imparted a desired temperature. The cleaning liquid is frequently desired to be heated to a temperature of 30-40° C. By using a storage tank designed as insulated buffer storage with a heater, only a small amount of liquid needs to be heated to the correct temperature and kept at this temperature in the insulated tank. Alternatively, hot cleaning liquid may led directly to the high-pressure pump from a supply network or a hot water tap.

During operation, liquid from the insulated storage tank is conducted into the hydrophore immediately before a cleaning cycle is to be performed. Hereby it is ensured that the temperature in the cleaning liquid is at the desired level when injected into the chamber.

It is noted that system for cleaning the ink chamber of the printing unit may be integrated in a unit that simultaneously contains pumps and valves for ink supply to the printing unit. Hereby is achieved a system which may be provided as an independent unit for providing a chamber with ink and subsequently perform cleaning of the chamber. Such a unit may be provided in an independent cabinet, however, it is preferred that the hydrophore will be provided outside such a cabinet in immediate connection to the ink chamber itself as mentioned above.

According to a further embodiment, the system is peculiar in that the ink chamber is provided with a number of ink inlets and ink outlets along its length, the inlets and the outlets connected with a common ink supply and a common outlet for ink, respectively. By this embodiment, ink is not to pass through the entire chamber from inlets to outlet. Instead, the ink inside the chamber will be brought in contact with a screen roller and is only conducted a short distance before reaching an outlet. The risk of ad-mixing air into the ink is thus minimised.

Furthermore, it is ensured that new ink comes into the chamber continuously. Hereby is achieved the best possible quality in the colour print. In prior art systems, the quality of the colour may depreciate by admixing air. By experience there is up to 15% air mixed with the ink when it has passed through the chamber once.

Furthermore, an increased number of inlets and outlets will enable easier cleaning of the chamber, as cleaning liquid, which is pressed through ink inlets and outlets during the cleaning cycle, is provided a lot of available apertures opening into the chamber. These apertures may function as a kind of cleaning nozzles assisting other cleaning nozzles in the chamber at the cleaning.

The invention will subsequently be explained more closely with reference to the accompanying drawing, wherein:

BRIEF DESCRIPTION OF THE DRAWINGS

FIG. 5 shows a schematic section through a further embodiment of a doctor blade for a system according to the invention; and FIG. 6 shows a schematic plan view of the doctor blade of FIG. 5 as seen from the front.

DETAILED DESCRIPTION OF THE PREFERRED EMBODIMENTS

In the subsequent Figures, identical or corresponding elements are designated with the same designations, and therefore no specific explanation is provided in connection with each single Figure.

Figure 1:
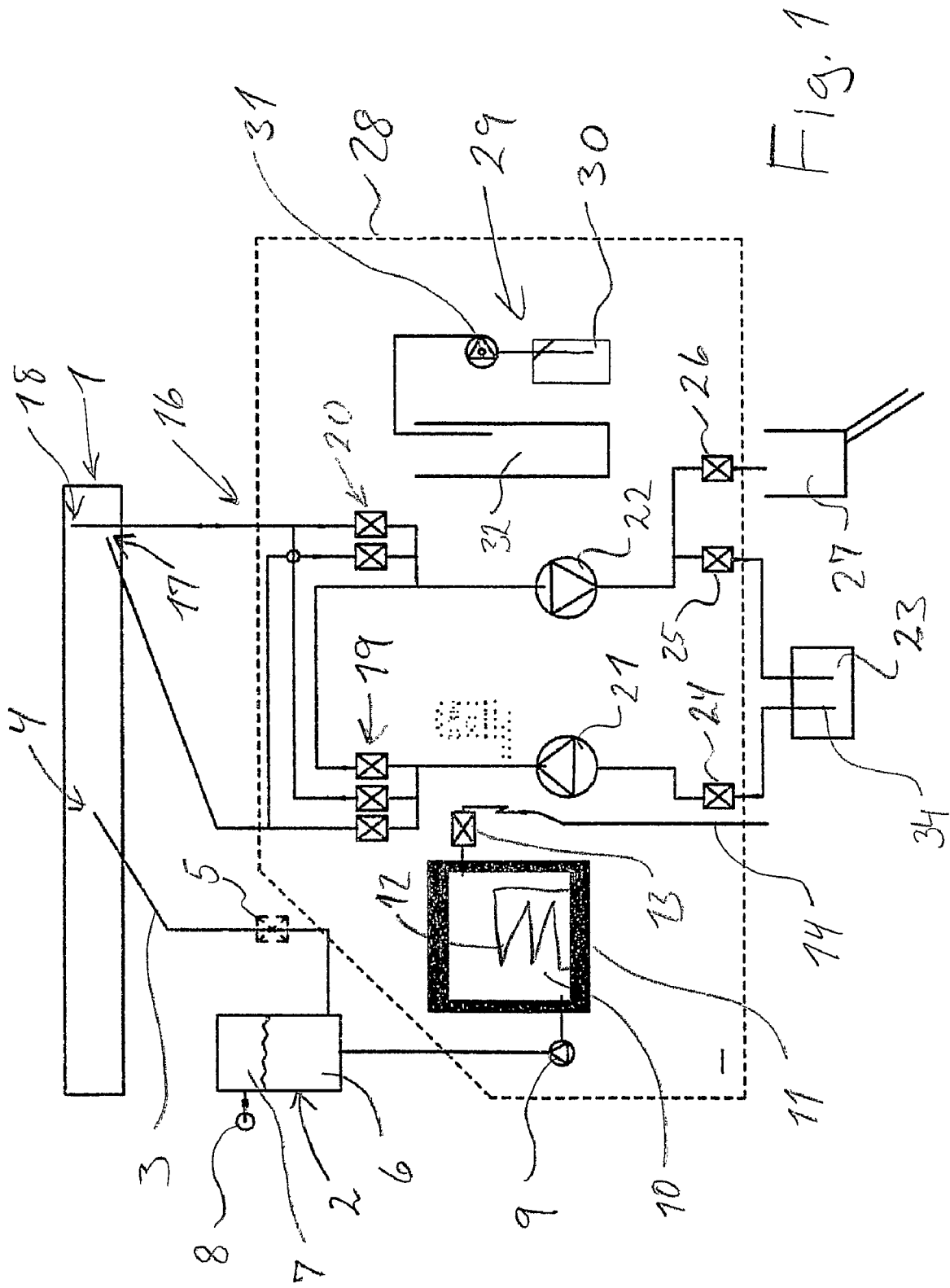
FIG. 1 shows a schematic illustration of a first embodiment of a system according to the present invention.

In FIG. 1 is shown a doctor blade 1 intended for flexographic printing. A hydrophore 2 is connected with an injection opening 4 in the chamber via a connecting line 3. In the line 3 is inserted a valve 5 connecting the hydrophore with the chamber 1. In the hydrophore is provided cleaning liquid 6 and air 7. The hydrophore is connected with a standard pressurised air system and a high-pressure liquid pump 9. The high-pressure liquid pump connects the hydrophore 2 with a storage tank 10 which is provided with insulation 11 and a heater 12. Via a valve 13, the storage tank 10 is connected with a supply line 14 for cleaning liquid or cold/hot water. Alternatively, the connection line 14 is connected with an external liquid supply system, as for example a water tap.

FIG. 1 shows that the doctor blade 1 is also connected with an ink supply system generally designated 16. Hereby ink is conducted via an inlet 17 for circulating through the chamber to be returned via an outlet 18 from the doctor blade. The system for supplying ink includes valve arrangements 19, 20 for switching inks and pumps 21, 22 for supplying and returning inks. The ink is provided from ink storage 23 and is supplied via valves 24, 25. By means of the pump 22, return ink or flushing liquid may be conducted to a drain 27 via a valve 26.

The system for ink supply is advantageously integrated with the system for providing cleaning liquid, including the tank 10 with heating means and the high-pressure pump 9. The hydrophore in FIG. 1 is shown placed outside a cabinet 28. The hydrophore 2 is shown schematic as a separate chamber, but will in practice be provided as a longitudinal tubular duct disposed immediately behind the doctor blade 1. This tubular duct will preferably be provided in a support beam for the doctor blade and be provided with a plurality of connecting lines 3 for a plurality of inlet openings 4.

In the cabinet 1 there is furthermore a schematic illustration of an arrangement 29, where a soap container 30 is connected with a container 32 via a pump 31. The container 32 is used for cleaning suction lances which are used for sucking up ink from the ink container.

Figure 2:
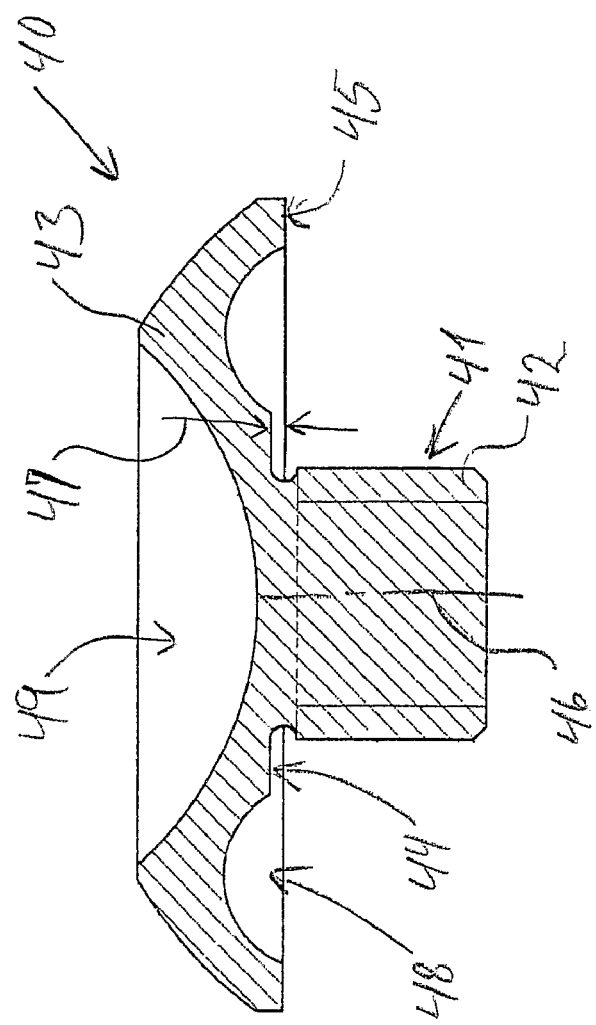
FIG. 2 shows a section through a cleaning nozzle according to the invention.

FIG. 2 shows a nozzle body in the shape of a mushroom-shaped plug 40 having a stem 41 which is provided with a thread 42 for inserting in a hole in the wall of a doctor blade or in an opening in a bushing which is inserted in such a doctor blade for forming a cleaning nozzle 33. The plug 40 has furthermore a circular domed hat or top 43 of an elastic, resilient plastic material. The top 43 has a radial inner surface 44 and a radial outer surface 45 which are disposed in planes perpendicularly to a longitudinal axis 46 through the stem 42. The surface 44 is displaced by the distance 47 relative to the surface 45. When the plug 40 is screwed into a wall in the ink chamber with the surface 44 in abutment against the sidewall, the surface 45 will be pressed back and thereby form resilient abutment against the chamber wall. Intermediate areas 48 with a cutout are provided between the inner and outer surface 44, 45. Opposite this cutout injection openings are provided, as explained in connection with FIG. 4 in the following.

In the top of the domed hat 43 there is provided cutout 49 intended for engagement with a screw driver or other tool for fastening or loosening the plug.

Figure 3:
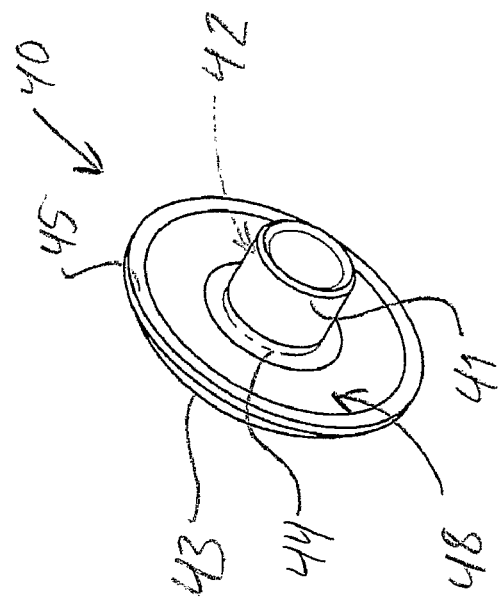
FIG. 3 shows a perspective view of a the cleaning nozzle shown in FIG. 2.

FIG. 3 shows a perspective view of the plug 40 which illustrates that it is made with a circular shape of the domed top 43. An annular abutment face 45 formed by the outer surface is thus achieved. This surface will, by abutment against the chamber wall, block injection openings as it more clearly appears from FIG. 4.

Figure 4:
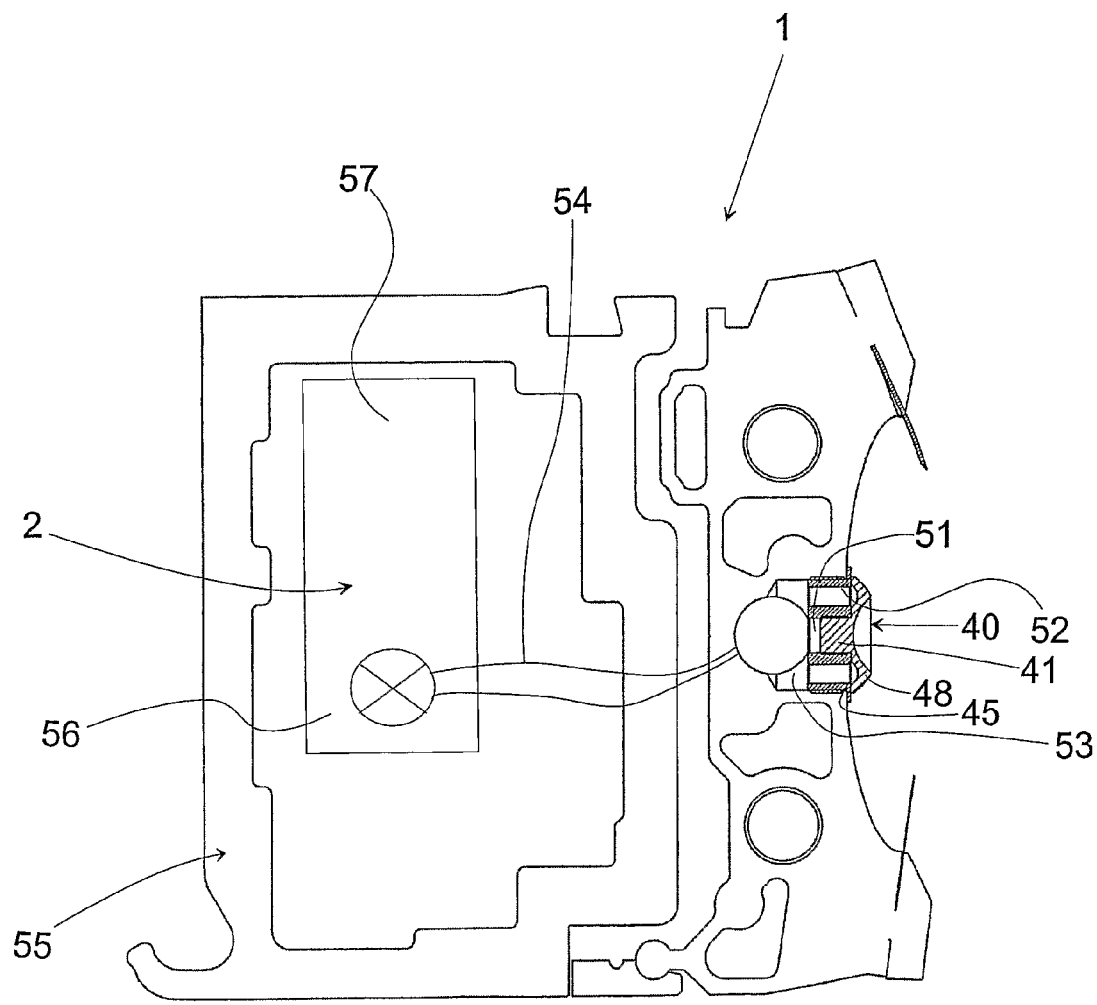
FIG. 4 shows a section through a doctor blade for a system according to the invention.

FIG. 4 shows a cross-section through a doctor blade 1. The plug 40 is placed in a bushing 50 so that they together may be said to form the cleaning nozzle 33. The bushing 50 has a central opening 51 for receiving the stem 41 of the plug 40 and injection openings 51 disposed around the opening 51 at a position within the area of the plug.

The injection openings 52 communicate with a chamber 53. Via a connecting line 54, the chamber 53 is connected with a hydrophore 2 formed as an elongated chamber 56 within a supporting profile 55 disposed behind the doctor blade 1, and where the chamber 56 is partly filled with cleaning liquid at a time immediately before activating a valve 57 in the connecting line 54. It is noted that other connections between the cleaning nozzle and the hydrophore are possible.

FIG. 5 shows a cross-section through a further embodiment of a doctor blade 1. In this doctor blade, the cleaning nozzles are omitted for the sake of clarity. An inlet opening 58 for ink and an outlet opening 59 for ink are shown in the doctor blade 1.

As it also appears from FIG. 6, a number of inlet openings 58 are placed in a row. These inlet openings are mutually connected with a line or boring 60 which is connected with the ink inlet 17. It furthermore appears that there are provided a number of inlet openings 59 which are mutually connected with a line or a duct 61 connected with the ink outlet 18.

In operation, ink flowing in through an inlet opening 58 will be conducted to an obliquely opposite outlet opening 59 via a single passage through the chamber as indicated by 62. The ink will thus have a relatively short retention time in the doctor blade and hereby a very brief contact with the rotating screen roller, whereby the risk of admixture of air is minimised. Hereby the quality of the ink is improved, compared with ink circulating from one end of the chamber to an outlet at the other end of the chamber, and which thereby is imparted contact with the rotating screen roller a number of times.

Furthermore, the inlet openings 58 will act as a kind of cleaning nozzles by cleaning the chamber when the ink supply system is flushed.

The openings 58, 59 will have different mutual spacing and different diameter in order to correspond to pressure drop and ensure a uniform flow over the entire length of the chamber.

The invention claimed is:

1. A method for cleaning the ink chamber of a printing unit, preferably a chamber in a doctor blade, where pressurised cleaning liquid is sprayed into the chamber through at least one cleaning nozzle, characterised by partial filling of a hydrophore with liquid from a storage tank, a supply system or a water tap by means of a high-pressure pump, building up a predetermined pressure in the hydrophore, activation of at least one valve which is disposed between the hydrophore and the cleaning nozzle for injecting at least one shot of cleaning liquid in the ink chamber for executing a cleaning cycle controlled by the activation cycle of the valves.

2. Method according to claim 1, characterised by filling a storage tank with cleaning liquid and transferring a volume of cleaning liquid from the storage tank for filling the hydrophore, where each cleaning cycle includes a number of shots with an interval of 5-15 seconds, preferably about 10 seconds.

3. Method according to claim 1, characterised in that the hydrophore and the ink chamber are blown through for driving out cleaning liquid at the termination of a cleaning cycle.

4. Method according to claim 1, characterised in that the cleaning liquid is heated, possibly in the storage tank, before filling into the hydrophore, and that the hydrophore is emptied at each cleaning cycle and is only re-filled with heated cleaning liquid immediately before a new cleaning cycle.

5. Method according to claim 1, characterised in that the predetermined pressure in the hydrophore is between 3 and 30 bar, preferably between 12 and 20 bar and particularly about 16 bar.

6. Method according to claim 1, characterised in that each cleaning nozzle is spring biased towards a closed position, where it covers injection openings in the chamber, and that the pressure in the cleaning liquid overcomes the spring biasing by an injection shot.

7. Method according to claim 5, characterised in that each cleaning nozzle is adapted to open at a pressure between 2 and 12 bar, preferably between 4 and 8 bar.

8. A system for cleaning an ink chamber of a printing unit, preferably a chamber in a doctor blade, including at least one cleaning nozzle through which pressurised cleaning liquid is sprayed into the chamber, characterised in that it includes a hydrophore connected with a storage tank, supply system or a water tap via a high-pressure pump for transferring a volume of cleaning liquid for partly filling the hydrophore for building up a predetermined pressure in the hydrophore, at least one activatable valve disposed in a connection between the hydrophore and the cleaning nozzle, and which is adapted for opening the connection for injecting a shot of cleaning liquid into the ink chamber, and which is connected with a control for executing a cleaning cycle controlled by the activation cycle of the valves.

9. System according to claim 8, characterised in that the hydrophore is connected with a source of pressurised air, preferably a standard pressurised air facility, so that the hydrophore and the ink chamber may be blown through for driving out cleaning liquid at the termination of a cleaning cycle.

10. System according to claim 8, characterised in that each cleaning nozzle is spring biased towards a closed position where it covers injection openings in the chamber, and that the pressure in the cleaning liquid overcomes the spring biasing by an injection shot.

11. System according to claim 8, characterised in that the hydrophore is tubular and formed in a support profile for the doctor blade or in a section of the wall of the doctor blade in order to have short connecting lines/tubes between the hydrophore and the cleaning nozzles.

12. System according to claim 8, characterised in that a number of inlets and outlets are provided in the chamber, the inlets and outlets being distributed along the length of the chamber, as a row of inlets are disposed at one side of the chamber while a row of outlets are disposed at the opposite side of the chamber, that the row of inlets are connected with a common ink supply, and that the row of outlets are connected with a common outlet for ink.

13. A cleaning nozzle for use in a chamber in a doctor blade, where pressurised cleaning liquid is injected into the chamber through at least one such nozzle, characterised in that it includes a largely mushroom-shaped nozzle body with a stem intended for mounting in the wall of the chamber, and which has a domed top of an elastic material, and furthermore that the nozzle also includes a second nozzle body in the form of a bushing for disposition in an opening in the chamber wall and with a central boring for accommodating the stem of the nozzle body and with through-going openings disposed thereabout, the openings covered by the domed top.

14. Cleaning nozzle according to claim 13, characterised in that the domed top is intended for covering injection openings in the chamber and designed with a radial inner and outer surface which is largely perpendicular to the stem and which is intended for contact with the chamber wall at the mounting of the nozzle in an opening in the wall, and that the radially outer surface is arranged to extend in unloaded condition to a position further down over the stem than the position of the inner surface.

15. Cleaning nozzle according to claim 13, characterised in that the stem is provided with screw thread and adapted to be fastened by screwing into an opening in the chamber wall, and that the domed top has a notch for engaging a tool.

16. Cleaning nozzle according to claim 13, characterised in that it is made of plastic, preferably PVDF.

* * * * *